(12) United States Patent
Yoneji

(10) Patent No.: US 7,813,639 B2
(45) Date of Patent: Oct. 12, 2010

(54) CAMERA COVER

(75) Inventor: Osamu Yoneji, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 300 days.

(21) Appl. No.: 11/886,146

(22) PCT Filed: Mar. 24, 2006

(86) PCT No.: PCT/JP2006/005961

§ 371 (c)(1),
(2), (4) Date: Sep. 12, 2007

(87) PCT Pub. No.: WO2006/114963

PCT Pub. Date: Nov. 2, 2006

(65) Prior Publication Data

US 2009/0041452 A1     Feb. 12, 2009

(30) Foreign Application Priority Data

Apr. 20, 2005   (JP) ............................... 2005-122332
Oct. 5, 2005    (JP) ............................... 2005-292289

(51) Int. Cl.
*G03B 11/04* (2006.01)
(52) U.S. Cl. ....................................... 396/544; 359/611
(58) Field of Classification Search ................ 396/6, 396/535, 544, 534; 359/611; D16/200–203
See application file for complete search history.

(56) References Cited

U.S. PATENT DOCUMENTS 2,466,786 A * 4/1949 Throne ........................ 359/611

(Continued)

FOREIGN PATENT DOCUMENTS

DE       102 37 607 B4     3/2004

(Continued)

OTHER PUBLICATIONS

Aug. 28, 2009 Office Action issued in Chinese patent application No. 2006800084566 (with translation).

(Continued)

*Primary Examiner*—W. B. Perkey
*Assistant Examiner*—Dennis Hancock
(74) *Attorney, Agent, or Firm*—Oliff & Berridge, PLC

(57) ABSTRACT

It is an object of the present invention to mount a focusing mechanism of a camera device on a vehicle without bringing the mechanism in contact with a worker's hands in an in-focus state of a lens system in the camera device having an eyelid part for preventing stray light covering part of a lens, and to improve the beauty and increase mounting flexibility. In a camera cover according to the present invention, a cylinder body (21) of the camera cover (10) covers most including the first half portion of the volume of the camera device, and the cylinder body (21), a frame body (23), an eyelid part (25) and/or an eyelid part (26), and a housing part (27) are integrally molded. Beauty seen from the front can be improved, and the beauty will not be spoiled when the camera device (12) is displaced together with the camera cover (10) and mounted.

6 Claims, 6 Drawing Sheets

U.S. PATENT DOCUMENTS

| | | | | |
|---|---|---|---|---|
| 4,852,836 | A * | 8/1989 | Kawazoe | 248/168 |
| 5,365,373 | A * | 11/1994 | Tanaka | 359/601 |
| 6,269,227 | B1 * | 7/2001 | Hamasaki et al. | 396/534 |
| 6,507,700 | B1 | 1/2003 | Takekuma et al. | |
| 2002/0044768 | A1 * | 4/2002 | Noda et al. | 386/118 |
| 2004/0189862 | A1 | 9/2004 | Gustavsson et al. | |
| 2005/0041963 | A1 * | 2/2005 | Dirisio | 396/6 |
| 2005/0117900 | A1 * | 6/2005 | Ohmori et al. | 396/448 |
| 2005/0157199 | A1 * | 7/2005 | Aoki | 348/360 |
| 2006/0007551 | A1 * | 1/2006 | Sakurai et al. | 359/611 |

FOREIGN PATENT DOCUMENTS

| | | |
|---|---|---|
| DE | 103 26 896 A1 | 12/2004 |
| JP | A 11-194398 | 7/1999 |
| JP | A 2002-090603 | 3/2002 |
| JP | D1220983 | 10/2004 |
| JP | D1220984 | 10/2004 |
| JP | D1226643 | 12/2004 |
| JP | D1226644 | 12/2004 |
| JP | D1226645 | 12/2004 |
| JP | D1226646 | 12/2004 |
| JP | D1226647 | 12/2004 |
| JP | A 2005-014673 | 1/2005 |

OTHER PUBLICATIONS

German Patent Office, Office Action mailed Apr. 20, 2010 in Serial No. 11 2006 000 931.1-51 w/English-language Translation.
Digideep: the online directory for underwater-imaging equipment. SONY-MPK-WA underwater housing URL: http://www.digideep.com/english/underwater/photo/housing/Sony/MPK-WA/34/1993/ [accessed on Apr. 9, 2010].
Sony Corporation: Marine Pack. Operating manual MPK-WA. URL: http://safemanuals.com/fulllswf-SONY.php?type=.SWF&file=SWF/SONY/10-10-07-03-01-47/3889&langue=en&img_width=2381&img_height=1678&cat=vide [accessed on Apr. 9, 2010].

* cited by examiner

F I G . 5
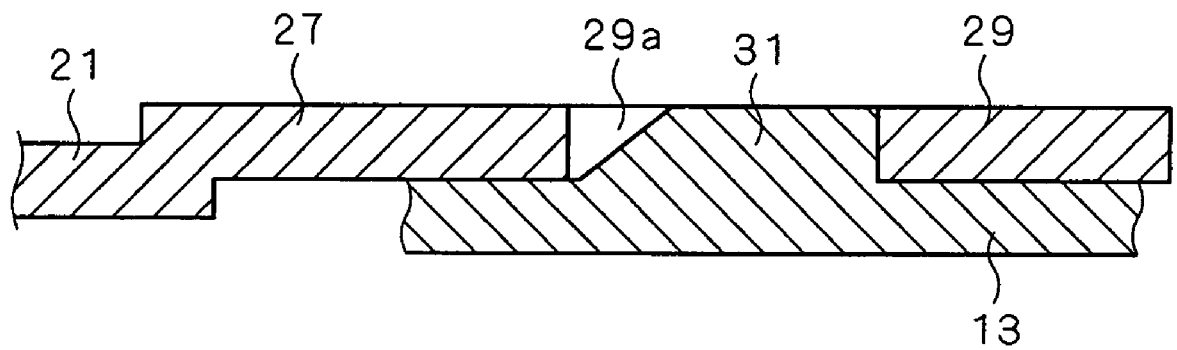

CAMERA COVER

TECHNICAL FIELD

The present invention relates to camera covers applied to camera devices mounted on vehicles.

BACKGROUND ART

There is a conventional technique of picking up an image of a dead angle of a vehicle by mounting a camera device such as a CCD camera on a bumper and the like of the vehicle, and displaying the picked up image on a display device inside the car.

Now, light which enters from obliquely above a camera device is not just unnecessary, but causes stray light by being reflected in a lens or a camera case.

To prevent such stray light, a shielding body 3 is disclosed as shown in FIGS. 10 and 11 that shields at least part of light from outside the image pickup visual field of a camera device body 1 mounted on a vehicle (e.g. patent documents 1 to 7).

The shielding body 3 includes a plate-like body 4 in almost annular shape, and an eyelid part 7 formed over a round opening part 4a of the plate-like body 4 to cover the upper half of a lens outer surface 5 of the camera device body 1. The eyelid part 7 shields light trying to enter the upper half of the lens outer surface 5. The inner surface of the eyelid part 7 has a shape along the shape of the lens outer surface 5.

The plate-like body 4 is formed in diameter dimensions bigger than the height dimension and width dimension of the camera device body 1 in order to hide the camera device body 1 positioned at the rear of the plate-like body 4.

On the rear surface of the plate-like body 4, four engagement members 9a, 9b and 9c in long piece shape are formed to extend toward the rear, so that the engagement member 9a engages a prescribed engagement part 9d of the camera device body 1.

When the plate-like body 4 is mounted to be level with a prescribed surface of wall such as a bumper of the vehicle, most of the camera device body 1 is hidden in the rear of the plate-like body 4, thus not spoiling the design of the vehicle.

Patent Document 1: Japanese Registered Design No. 1220983
Patent Document 2: Japanese Registered Design No. 1220984
Patent Document 3: Japanese Registered Design No. 1226643
Patent Document 4: Japanese Registered Design No. 1226644
Patent Document 5: Japanese Registered Design No. 1226645
Patent Document 6: Japanese Registered Design No. 1226646
Patent Document 7: Japanese Registered Design No. 1226647

Typically, the camera device body 1 includes a lens system, a CCD, a circuit substrate and the like therein. Thus in the patent documents 1 to 7, the camera device body 1 is greater in weight than the shielding body 3.

In addition, as the engagement members 9a, 9b and 9c in long piece shape of the shielding body 3 are used for the positioning so that only the engagement member 9a engages the engagement part 9d of the camera device body 1, it is difficult to hold the camera device body 1 only by the engagement members 9a, 9b and 9c of the shielding body 3. For this reason, after mounting the camera device body 1 on the vehicle, the shielding body 3 needs to be fixedly mounted to have its plate-like body 4 in close contact with the prescribed surface of wall such as the bumper of the vehicle, to support the shielding body 3 on the camera device body 1 side.

For the shielding body 3 to be fixedly mounted to have the plate-like body 4 in close contact with the prescribed surface of wall such as the bumper of the vehicle, however, the mounting position of the camera device body 1 needs to be set as preparatory work in a manner that brings the plate-like body 4 in close contact with the prescribed surface of wall such as the bumper of the vehicle. Such work has to be conducted before mounting the shielding body 3, which makes the work difficult. When mounting the shielding body 3 after mounting the camera device body 1 on a vehicle, particularly when a focusing mechanism called an adjuster (now shown) to focus with adjustment to the position of a lens in an optical axis direction is provided in the vicinity of the front end of the camera device body 1, a worker may come in contact with the adjuster by mistake. The contact with the adjuster may cause deviation from the original lens position, which results in out-of-focus vision.

Further, despite the fact that optical axis directions of the camera device body 1 may vary by vehicle type, so the mounting position of the camera device body 1 and the mounting position of the shielding body 3 vary depending on the vehicle type and the like, the aforementioned conventional technique is greatly restricted in that the plate-like body 4 of the shielding body 3 has to be mounted in close contact with the bumper, and so forth. Particularly when the plate-like body 4 of the shielding body 3 is displaced and mounted in front of the bumper, the beauty of the vehicle will be spoiled.

Another disadvantage is that the engagement members 9a, 9b, and 9c in long piece shape extending toward the rear from the rear surface of the plate-like body 4 have low strength, and thus have low impact resistance.

DISCLOSURE OF INVENTION

It is therefore an object of the present invention to provide a technique capable of mounting a focusing mechanism of a camera device on a vehicle without bringing the mechanism in contact with a worker's hands in an in-focus state of a lens system in the camera device having an eyelid part for preventing stray light covering part of a lens, with high mounting flexibility, excellent beauty, and high strength.

To solve the aforementioned problems, in a first aspect of a camera cover according to the present invention, the camera cover includes: a cylinder body housing at least a lens system of a camera device, the camera device including the lens system and an image pickup device and being mounted on a vehicle; and an eyelid part integrally molded on an open frontal part of the cylinder body, wherein the eyelid part shields light which enters the lens system from an area other than an image pickup angle of view area, the image pickup angle of view area being defined as a range in which light which enters the lens system is formed on the image pickup device within angles of view of the lens system.

In a second aspect of the camera cover according to the present invention, the camera cover according to the first aspect further includes a frame body integrally molded on the open frontal part of the cylinder body to reinforce the cylinder body.

In a third aspect of the camera cover according to the present invention, the camera cover according to the first or second aspect further includes an engagement means formed at the rear end of the camera cover to engage the camera device at the rear end of the camera cover.

In a fourth aspect of the camera cover according to the present invention, in the camera cover according to one of the first to third aspects, the eyelid part includes a first eyelid part shielding light which enters the lens system from an area above the image pickup angle of view area.

In a fifth aspect of the camera cover according to the present invention, in the camera cover according to one of the first to fourth aspects, the eyelid part includes a second eyelid part shielding light which enters the lens system from an area below the image pickup angle of view area.

According to the first aspect of the camera cover of the present invention, the eyelid part shields light which enters the lens system from an area other than the image pickup angle of view area, thus preventing stray light in the camera device. In addition, the camera cover houses the entire lens system that takes up most including the first half portion of the volume of the camera device. Accordingly, the lens system can be housed in the camera cover in an in-focus state of the camera device body, and can be mounted on a vehicle in that state. This allows a focusing mechanism of the camera device to be mounted on the vehicle without becoming in contact with a worker's hands, thus preventing out-of-focus vision upon mounting on the vehicle. Further, most including the first half portion of the volume of the camera device can be covered with the camera cover. Thus beauty seen from the front can be maintained. The beauty of the vehicle will not be spoiled when the camera device is displaced together with the camera cover and mounted on the vehicle. This increases flexibility to mounting position.

According to the second aspect of the camera cover of the present invention, the cylinder body, the frame body and the eyelid part are integrally molded so that each of these elements reinforce the strength of the other, thereby providing a camera cover having higher strength than a conventional shielding body.

According to the third aspect of the camera cover of the present invention, the engagement means to engage the camera device is formed at the rear end of the camera cover. Thus beauty seen from the front can be maintained. The beauty of the vehicle will not be spoiled when the camera device is displaced together with the camera cover and mounted on the vehicle. This increases flexibility to mounting position.

According to the fourth aspect of the camera cover of the present invention, the eyelid part includes a first eyelid part shielding light which enters the lens system from an area above the image pickup angle of view area. This prevents stray light resulting from sunlight or lighting mounted on a ceiling and the like.

According to the fifth aspect of the camera cover of the present invention, the eyelid part includes a second eyelid part shielding light which enters the lens system from an area below the image pickup angle of view area. This prevents stray light resulting from reflected light from the surface of a snow-covered road, for example.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a cross-sectional view of an engagement structure of a camera cover and a lens holder.

BEST MODES FOR CARRYING OUT THE INVENTION

First Preferred Embodiment

A description is given of a camera cover according to a first preferred embodiment of the present invention.

Figure 1:
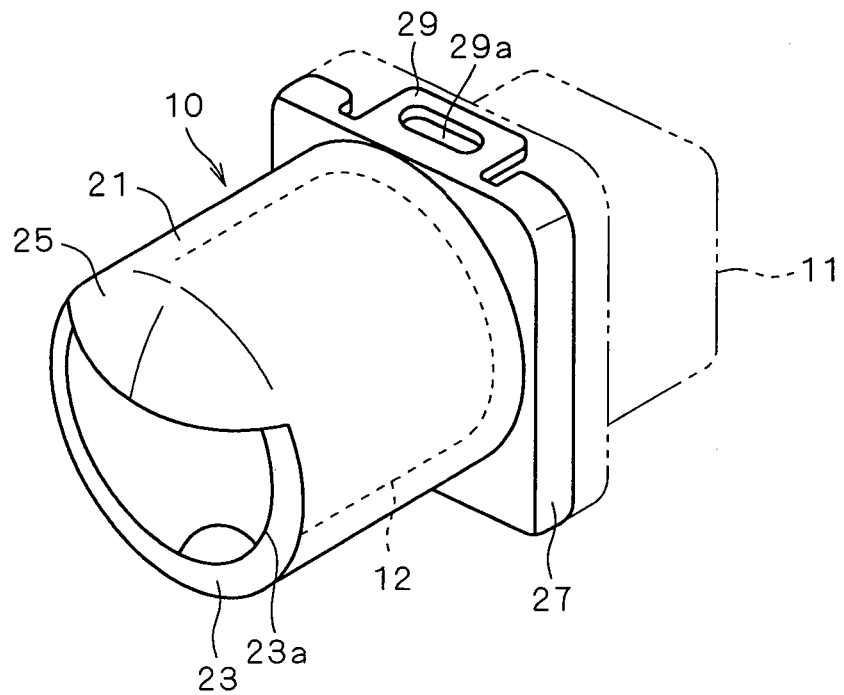
FIG. 1 is an appearance perspective view of a camera cover according to a first preferred embodiment of the present invention.
Figure 2:
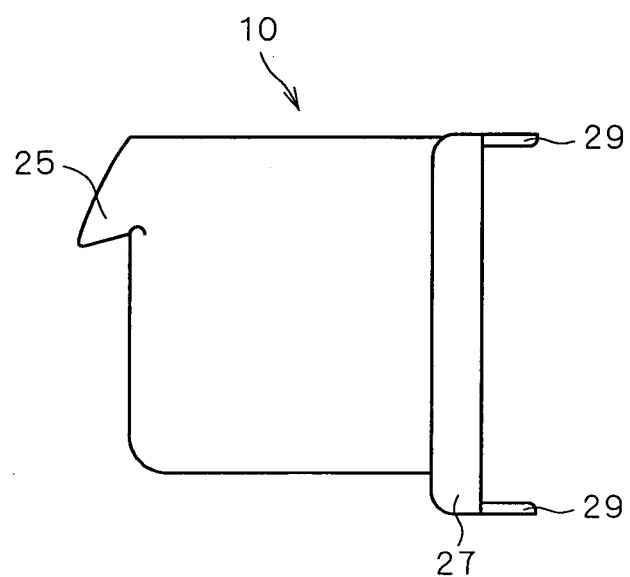
FIG. 2 is a side view of the camera cover according to the first preferred embodiment of the present invention.
Figure 3:
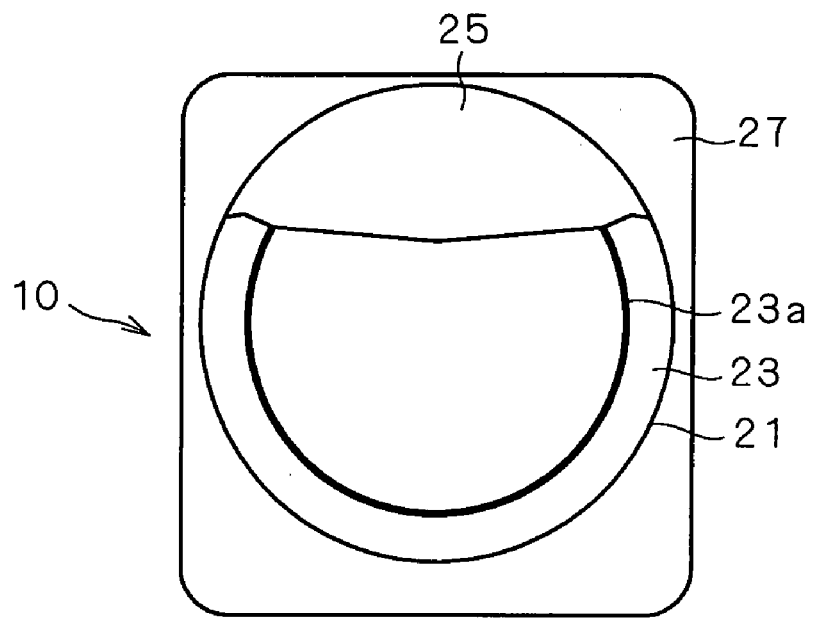
FIG. 3 is a front view of the camera cover according to the first preferred embodiment of the present invention.
Figure 4:
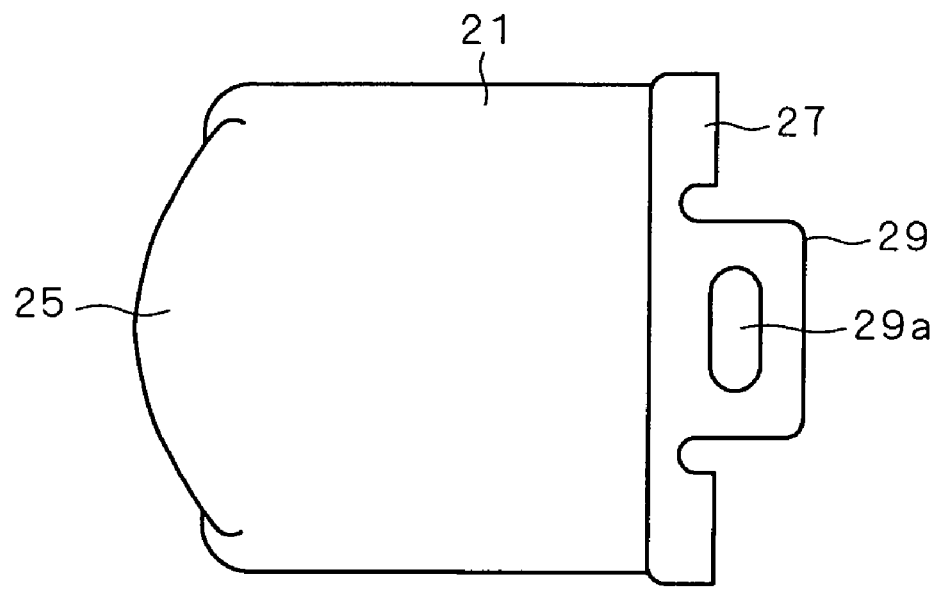
FIG. 4 is a plan view of the camera cover according to the first preferred embodiment of the present invention.

FIG. 1 is an appearance perspective view of a camera cover 10, FIG. 2 is a side view of the same, FIG. 3 is a front view of the same, and FIG. 4 is a plan view of the same.

The camera cover 10 houses a camera device 12 that picks up images of scenery around a vehicle to protect the camera device 12, and is mounted on a bumper, a ventilation grille or the like of the vehicle.

The camera device 12 housed in the camera cover 10 includes a lens system, an image pickup device such as a CCD that picks up an image formed by the lens system, and a circuit substrate for driving the image pickup device.

The camera cover 10 is formed from prescribed industrial plastic, and includes a cylinder body 21 housing cylinder portions which are not shown of the lens system and a lens holder 13 (FIG. 5), a frame body 23 in ring shape integrally molded on an open frontal part of the cylinder body 21, a first eyelid part 25 integrally molded to project toward the front at the upper half of the frame body 23 to cover the upper half of the outer surface of the front lens of the lens system of the camera device 12, and a housing part 27 housing a box body part of the lens holder 13 housing the CCD and the circuit substrate and the like for driving the CCD of the camera device 12. The housing part 27 is provided with an engagement piece 29 for engaging the lens holder 13 (FIG. 5) for holding the lens system and the circuit substrate.

The cylinder body 21 is formed in cylindrical shape, and houses the lens system therein.

The frame body 23 is formed in annular shape, and controls the range of light which enters the cylinder body 21 through an opening part 23a thereof, and also functions as a beam to reinforce the cylindrical shape of the cylinder body 21.

The eyelid part 25 is arranged on the upper half of the frame body 23, and is formed to project toward the front from a curved surface in a shape along a curved surface of the outer surface of the front lens of the lens system of the camera device 12, as illustrated in FIGS. 1, 2 and 4. The eyelid part 25 thus shields light from outside the upper half image pickup visual field out of light toward the opening part 23a of the frame body 23 in annular shape. That is, when the range in which light which enters the lens system is formed on the image pickup device of the camera device 12 within the entire angle of view of the lens system is defined as an "image pickup angle of view area", the eyelid part 25 shields light which enters the lens system from an area above the image pickup angle of view area.

The housing part 27 is integrally molded at the rear end of the cylinder body 21, and is formed in accordance with the dimensions of the circuit substrate to project in an outward direction from the shape of the cylinder body 21. The housing part 27 is formed in almost rectangular shape seen from the front, for example.

The engagement piece 29 is formed to project toward the rear from each of the upper and lower surfaces of the housing part 27, and has an engagement hole 29a formed in the center thereof. As illustrated in FIG. 5, this engagement hole 29a engages an engagement click 31 in almost wedge shape seen from the side which is formed in the lens holder 13 for holding the lens system and the circuit substrate. The camera cover 10 is thus positioned to a prescribed position with respect to the lens holder 13. A rear case 11 is fixed to the rear surface (not shown) of the lens holder 13 by screws and the like.

With the camera cover 10 of this structure for a camera device, light from outside the image pickup visual field is shielded by the eyelid part 25, and is prevented from entering the lens system. This prevents stray light in the camera device resulting from light from outside the image pickup visual field.

Further, the eyelid part 25 for shielding light from outside the image pickup visual field is integrally molded with the camera cover 10, and the camera cover 10 houses the lens system that takes up most including the first half portion of the volume of the camera device 12 as it is. Accordingly, the camera system can be housed in the camera cover 10 in an in-focus state of the camera device 12 body, and can be mounted on a vehicle in that state. This allows a focusing mechanism of the camera device 12 to be mounted on the vehicle without becoming in contact with a worker's hands, thus preventing out-of-focus vision upon mounting on the vehicle.

Further, the engagement members 9a, 9b and 9c in long piece shape are not arranged in front of the camera device body as in conventional techniques, but most including the first half portion of the volume of the camera device 12 can be covered with the camera cover 10. Thus beauty seen from the front can be maintained. The beauty of the vehicle will not be spoiled when the camera device 12 is displaced together with the camera cover 10 and mounted on the vehicle. This increases flexibility to mounting position.

Moreover, with the cylinder body 21, the frame body 23, the eyelid part 25 and the housing part 27 being integrally molded so that each of these elements reinforce the strength of the other, the camera cover 10 has higher strength than the conventional shielding body 3.

Second Preferred Embodiment

Next, a description is given of a camera cover according to a second preferred embodiment of the present invention.

Figure 6:
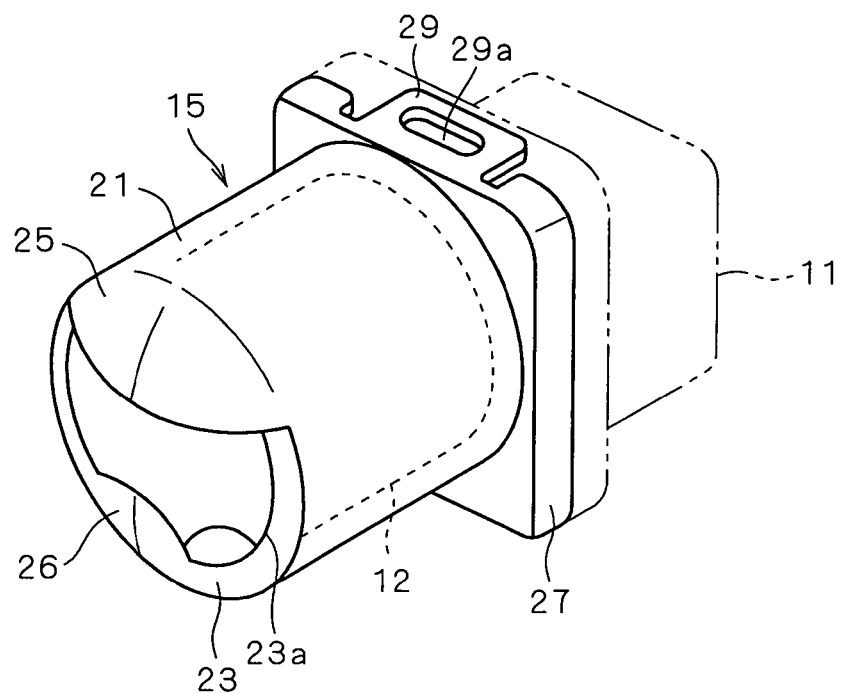
FIG. 6 is an appearance perspective view of a camera cover according to a second preferred embodiment of the present invention.
Figure 7:
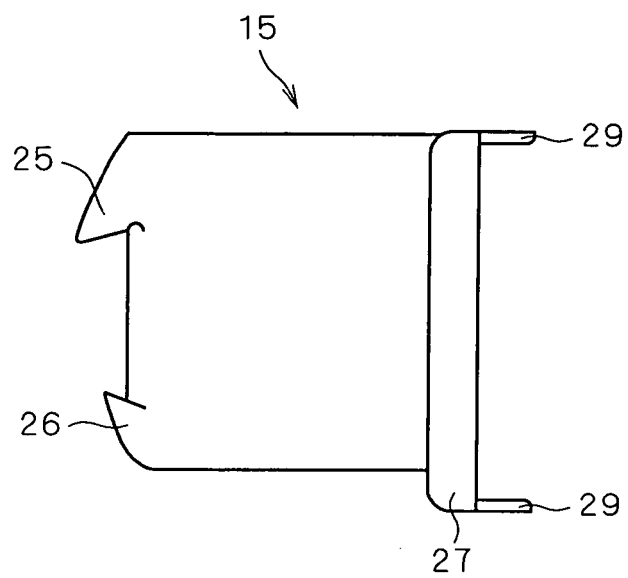
FIG. 7 is a side view of the camera cover according to the second preferred embodiment of the present invention.
Figure 8:
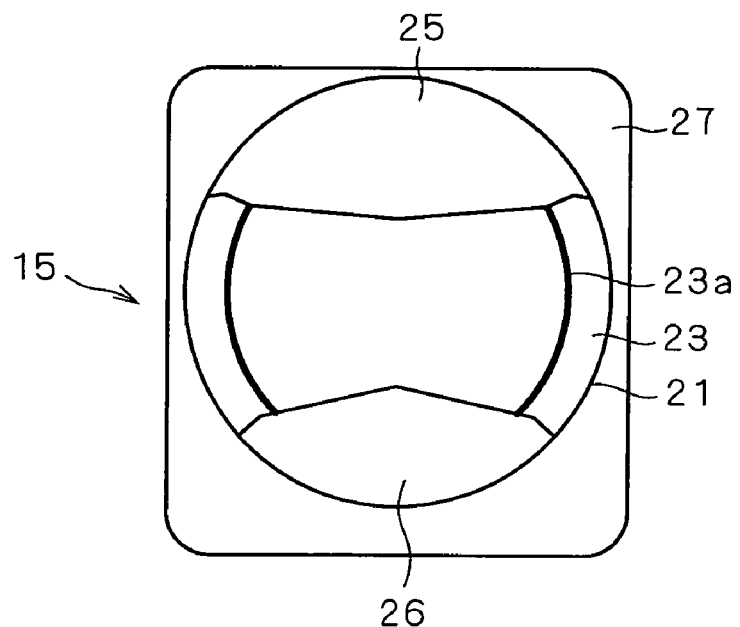
FIG. 8 is a front view of the camera cover according to the second preferred embodiment of the present invention.
Figure 9:
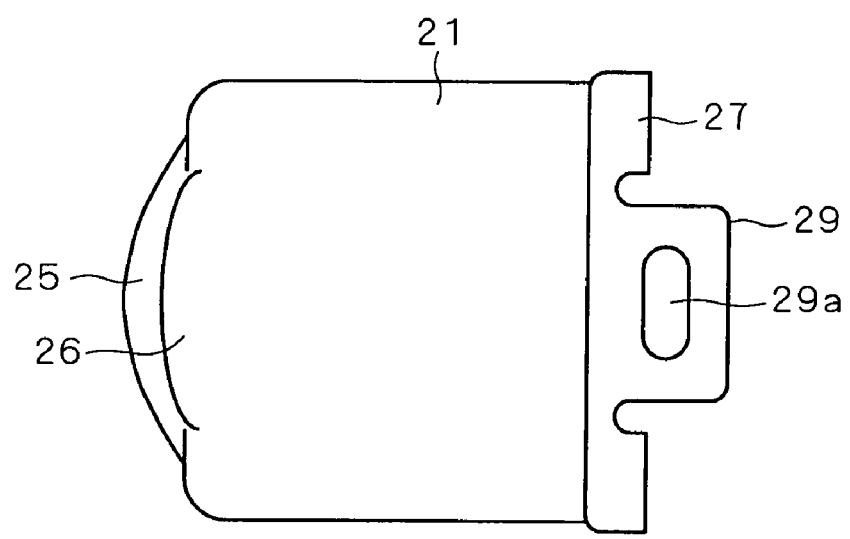
FIG. 9 is a bottom view of the camera cover according to the second preferred embodiment of the present invention.
Figure 10:
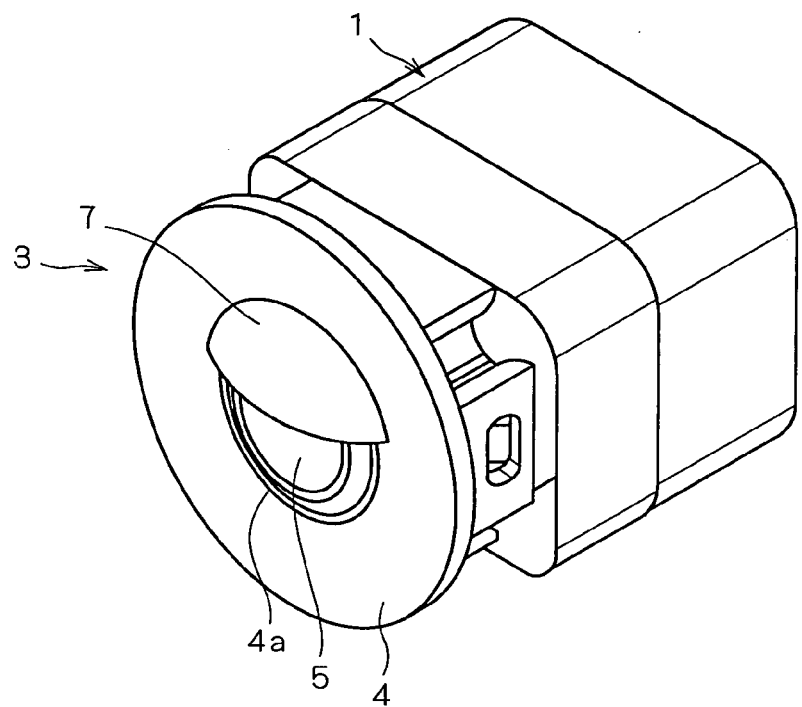
FIG. 10 is a perspective view of a conventional camera device and shielding body.
Figure 11:
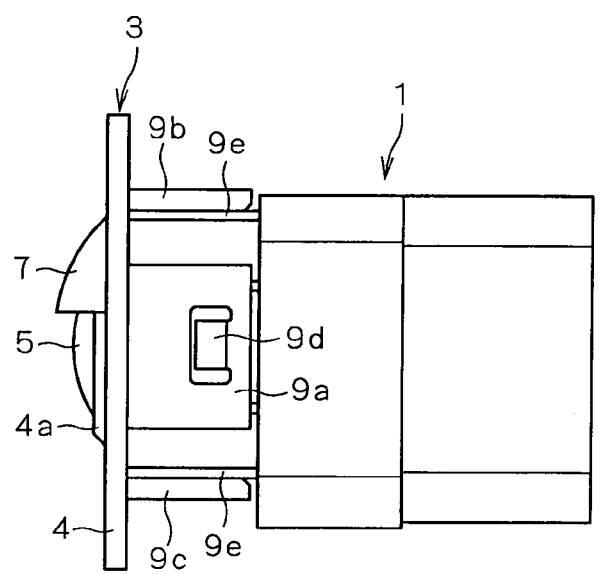
FIG. 11 is a side view of the conventional camera device and shielding body.

FIG. 6 is an appearance perspective view of a camera cover 15, FIG. 7 is a side view of the same, FIG. 8 is a front view of the same, and FIG. 9 is a bottom view of the same.

In FIGS. 6 to 9, the elements having similar functions as those in the first preferred embodiment have the same reference numerals, and descriptions of those elements will be omitted.

This camera cover 15 is provided with the eyelid part 25 (first eyelid part) of the first preferred embodiment, and further with an eyelid part 26 (second eyelid part), for example.

The eyelid part 26 is arranged on the lower half of the frame body 23, and is formed to project toward the front to form a curved surface in a shape along the curved surface of the outer surface of the front lens of the lens system of the camera device 12, as illustrated in FIGS. 6, 7 and 8. The eyelid part 26 thus shields light from outside the lower half image pickup visual field out of light toward the opening part 23a of the frame body 23 in annular shape. That is, when the "image pickup angle of view area" is defined as mentioned in the above first preferred embodiment, the eyelid part 26 shields light which enters the lens system from an area below the image pickup angle of view area.

The camera cover 15 does not always have to be provided with both the eyelid part 25 and the eyelid part 26, but may be provided only with the eyelid part 26.

The camera device 12, which is fabricated to have an anamorphic lens system so that a horizontal angle of view is broader than a vertical angle of view, can maintain a favorable field of view without reducing visibility when provided with the eyelid part 25 and/or the eyelid part 26.

With the camera cover 15 of this structure for a camera device, light from outside the upper half image pickup visual field is shielded by the eyelid part 25 and light from outside the lower half image pickup visual field is shielded by the eyelid part 26, so that both light are prevented from entering the lens system. Therefore, stray light resulting from sunlight or lighting mounted on a ceiling and the like can be prevented by the eyelid part 25, and stray light resulting from reflected light from the surface of a snow-covered road can be prevented by the eyelid part 26. The similar effects to those in the first preferred embodiment can also be attained.

While the invention has been shown and described in detail, the foregoing description is in all aspects illustrative and not restrictive. It is therefore understood that numerous modifications and variations can be devised without departing from the scope of the invention.

The invention claimed is:

1. A camera cover comprising:
   a cylinder body housing at least a lens system of a camera device, said camera device including said lens system and an image pickup device and being mounted on a vehicle; and
   an eyelid part integrally molded on an open frontal part of said cylinder body, wherein
   said eyelid part shields light which enters said lens system from an area other than an image pickup angle of view area by extending towards the center of said lens to form a curved surface in a shape conforming to a curved surface on a face of the lens system, said image pickup angle of view area being defined as a range in which light which enters said lens system is formed on said image pickup device within angles of view of said lens system.

2. The camera cover according to claim 1, further comprising
   a frame body integrally molded to extend inside said cylinder body on an open frontal part of said cylinder body to reinforce said cylinder body.

3. The camera cover according to claim 1, further comprising
   an engagement means formed at the rear end of said camera cover to engage said camera device at the rear end of said camera cover.

4. The camera cover according to claim 1, wherein said eyelid part includes a first eyelid part shielding light which enters said lens system from an area above said image pickup angle of view area.

5. The camera cover according to claim 4, wherein said eyelid part includes a second eyelid part shielding light which enters said lens system from an area below said image pickup angle of view area.

6. The camera cover according to claim 1, wherein said eyelid part includes a second eyelid part shielding light which enters said lens system from an area below said image pickup angle of view area.

* * * * *

UNITED STATES PATENT AND TRADEMARK OFFICE
CERTIFICATE OF CORRECTION

| | | |
|---|---|---|
| PATENT NO. | : 7,813,639 B2 | Page 1 of 1 |
| APPLICATION NO. | : 11/886146 | |
| DATED | : October 12, 2010 | |
| INVENTOR(S) | : Osamu Yoneji | |

It is certified that error appears in the above-identified patent and that said Letters Patent is hereby corrected as shown below:

On the Title Page,

Item [86], change "PCT/JP2006/005961" to --PCT/JP2006/305961--.

Signed and Sealed this
Fourth Day of January, 2011

David J. Kappos
*Director of the United States Patent and Trademark Office*